Figure 1:
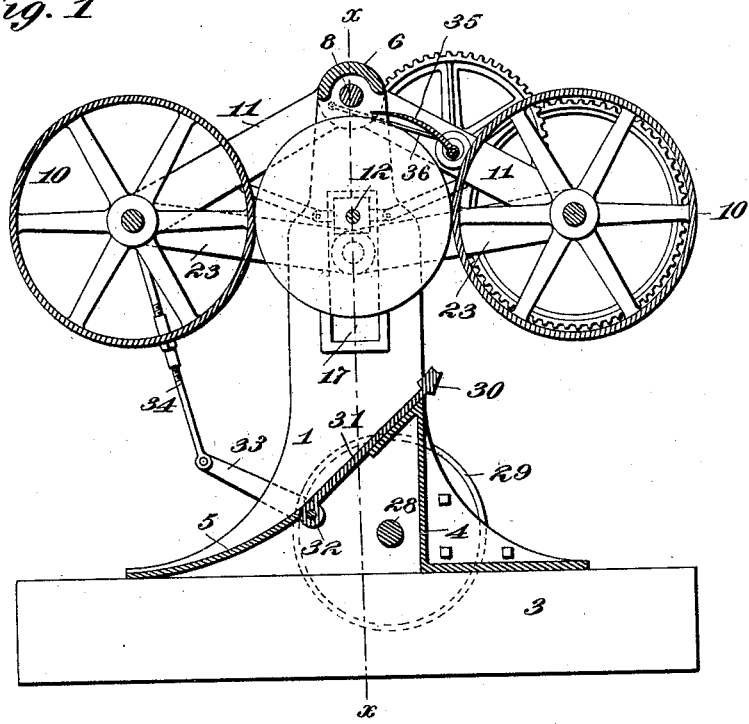

(No Model.) 2 Sheets—Sheet 1.

F. L. DYER.
COTTON PRESS.

No. 603,784. Patented May 10, 1898.

Witnesses.
J. F. Coleman
Archie G. Reese

Inventor
Frank L. Dyer (No Model.) F. L. DYER. 2 Sheets—Sheet 2.
COTTON PRESS.
No. 603,784. Patented May 10, 1898.

Witnesses.
J. F. Coleman
Archie G. Reen

Inventor
Frank L. Dyer

UNITED STATES PATENT OFFICE.

FRANK L. DYER, OF WASHINGTON, DISTRICT OF COLUMBIA, ASSIGNOR TO THE AMERICAN COTTON COMPANY, OF NEW YORK, N. Y.

COTTON-PRESS.

SPECIFICATION forming part of Letters Patent No. 603,784, dated May 10, 1898.

Application filed February 20, 1896. Serial No. 580,022. (No model.)

*To all whom it may concern:*

Be it known that I, FRANK L. DYER, a citizen of the United States, residing at Washington, in the District of Columbia, have invented certain new and useful Improvements in Cotton-Presses, (Case No. 24;) and I do hereby declare the following to be a full, clear, and exact description of the invention, which will enable others skilled in the art to which it appertains to make and use the same.

My invention relates to various new and useful improvements in cotton-presses, and the particular type of cotton-press to which the invention has specific reference is that employed for making cylindrical bales.

Preferably the invention is carried out in connection with a two-roll press of the horizontal type; but there are features of the invention which can be employed with presses having more than two rolls and with presses having two rolls which are vertically arranged.

It has been found in the practical operation of presses for making cylindrical bales that at the starting of the bale very light pressure should be applied to the sheet or bat, because there is danger of the sheet or bat becoming so tightly pressed upon the core as to cake the cotton thereon and make it difficult to entirely unwind the bale. As the bale enlarges in size, however, this pressure may and preferably should be gradually increased.

It is one of the objects of my invention to so arrange the baling-rolls that at the starting of the bale said rolls will apply to the sheet or bat only a very light pressure, which pressure will gradually increase as the bale increases in size.

Another object of the invention is to simplify and cheapen the construction of cotton-presses of this type.

Another object is to so mount the baling-rolls that they may apply to the bale the entire pressure thereon, although I shall describe herein means for supplementing this pressing action.

A further object of the invention is to provide means in a horizontal two-roll press for causing the sheet or bat to commence to wind around the core and to thereby overcome a danger now recognized in such presses, of the sheet or bat passing out of contact with the core and refusing to wind thereon at the start.

Another object of the invention is to provide means for preventing the sheet or bat after it has passed down one roll and thence under the core from following the periphery of the other roll and thereby be carried away from the core, which is another danger with such presses.

In order that my invention may be better understood, attention is directed to the accompanying drawings, forming a part of this specification, and in which—

Figure 2:
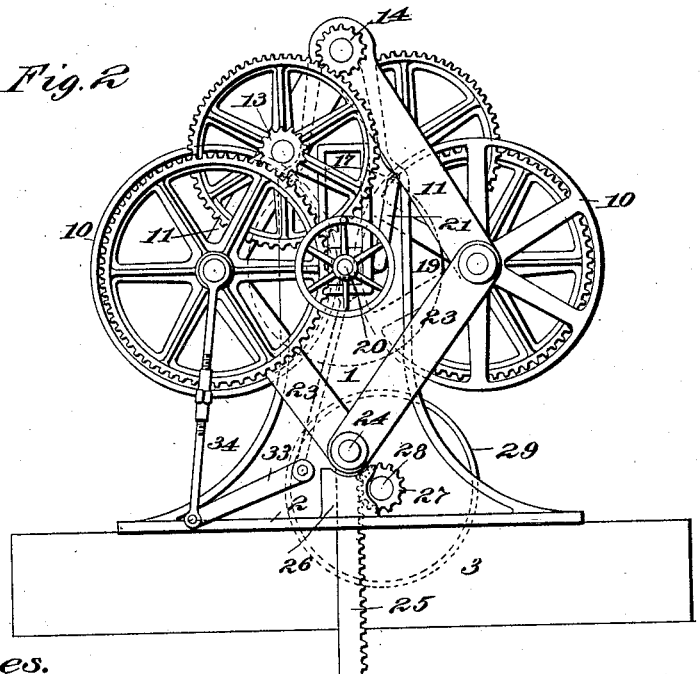
Figure 3:
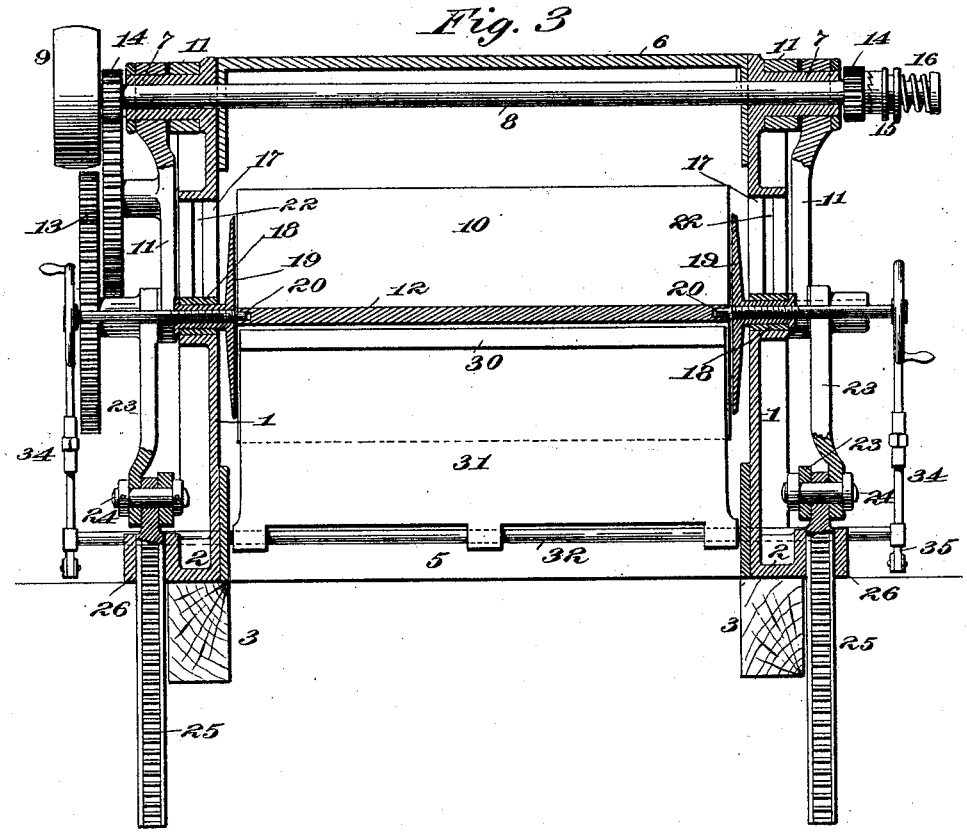
Figure 4:
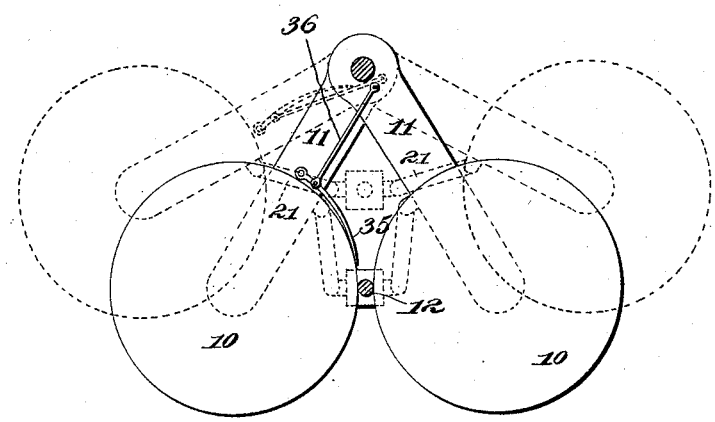

Figure 1 is a vertical sectional view of the press; Fig. 2, a side elevation thereof; Fig. 3, a section on the line $xx$ of Fig. 1, and Fig. 4 a diagrammatic view illustrating the position of the baling-rolls at the commencement of the bales and in dotted lines the position of the baling-rolls when the bale is finished.

In all of the views corresponding parts are designated by the same numerals.

1 1 represent side frames of any suitable construction, formed with heavy horizontal flanges 2 2 at the lower ends thereof, which may be secured to skids 3 3. The side frames are suitably strengthened by a heavy angle-piece 4 at the lower end thereof, and also by means of a cross-plate 5, which also acts as a chute for receiving the bale, as will be presently described. Preferably a heavy cross-piece 6 connects the side frames 1 1 at the top thereof, so that a very firm and rigid framework is obtained.

At the upper end of each side frame is an extension-bearing 7, within which is mounted a main driving-shaft 8, having a face-wheel 9, to which the power is applied.

10 10 are the baling-rolls, in this instance two of said rolls being shown, mounted in a horizontal plane. These baling-rolls are carried in swinging arms 11 11, which are mounted at their upper ends on the bearings 7, whereby the said baling-rolls 10 at the commencement of the baling operation may be allowed to swing downward, so as to come into contact with the core 12, and as the bale enlarges be gradually moved up and out, as will be understood.

It will be evident that when the baling-rolls are at their lowest position they will apply very little pressure to the bale and that as they are moved upward this pressure will be gradually increased.

The baling-rolls 10 10 are driven from the main shaft 8, preferably by a train of gearing 13, engaging with pinions 14 14 on said driving-shaft 8, one of said pinions being loose on the shaft, but adapted to be connected therewith by means of a clutch 15, which is normally held in engagement with said pinion by a spring 16, being adapted to be moved out of that engagement by a lever. (Not shown.)

Preferably the gears 13 for the two baling-rolls are arranged at opposite sides of the machine, as shown in Fig. 2, and it is, furthermore, desirable that the shafts for said gears should extend directly across the machine, so as to materially stiffen the swinging arms 11.

17 is a guideway formed in each side frame, and preferably in each guideway 17 is a bearing-box 18, in which is revolubly mounted an end flange 19, which abuts against the bale during its formation and revolves therewith.

In each end flange is a pin 20 for receiving the ends of the core 12, which pins are operated in any suitable way. In the drawings I illustrate a screw-threaded shaft revolved by means of a hand-wheel for drawing these pins 20 from the ends of the core.

As the bale forms it is desirable that it be moved upward with the baling-rolls, so as to be always in the same horizontal plane therewith, and in order that this may be done I connect the boxes 18 at each side of the machine with the swinging arms 11 by means of links 21, so that as said swinging arms 11 move outward the links 21 will move the boxes 18 upward.

Preferably each guideway 17 is formed with a vertical slot 22 therein, in which works a spline at each end of the boxes 18, so that said boxes will travel true in said guideway.

In order that the two baling-rolls 10 10 may be kept always parallel when the cotton through accident accumulates faster at one side of the bale than at the other, I prefer to employ a parallel mechanism for causing the arms 11 at each side of the machine to move with exact regularity, and in the figures I show a convenient device for doing this.

Connected to each swinging arm 11 at each side of the machine by means of a hinged joint is a heavy arm 23, which may be conveniently connected at its upper end to the bearing-box for the rolls 10, and said arms 23 at each side of the machine are connected together at their lower ends by a heavy pin 24, on which is mounted between said arms the upper end of a heavy rack 25, working in a bearing 26, formed in the side frames 1. Engaging with each of said racks is a pinion 27, keyed to a heavy shaft 28, working in bearings in the side frames 1 1. By means of this construction it will be obvious that the swinging arms 11 will be kept perfectly parallel in their movements, so that there will be no danger of the baling-rolls 10 10 getting out of line.

When the baling-rolls 10 10 are made of sufficient weight, they may serve to effect the entire compression of the bale; but preferably I supplement this baling action in any suitable way. For instance, there may be a hydraulic or pneumatic cylinder secured to the lower end of each rack 25 or said racks may be connected together, and to the crosshead thus used a single hydraulic or pneumatic cylinder may be connected. Preferably, however, I employ a brake device for this purpose and mount on the shaft 28 a face-wheel 29, to which a suitable brake or other resisting device may be connected.

In order that the cotton may be caused to commence to wind around the bale at the starting of the bale and to overcome the danger of the cotton passing down upon one of the rolls and refusing to wind around the core, I mount beneath the core 12 and between the two baling-rolls when they are at their lowermost position a bar 30, which will obstruct the bat and cause it to wind around the core. In the type of machine shown it is necessary that this bar 30 be moved out of the way as the baling-rolls 10 are elevated, so as not to obstruct the free ejection of the bale from the machine, and a convenient arrangement is to mount this bar 30 at the upper end of a plate 31, which when the baling-rolls are at their elevated positions forms a continuation of the plate 5 and thereby offers an inclined guide or chute for receiving the finished bale and allowing it to roll out of the machine. The plate may therefore be keyed to a shaft 32, to the outside of which, at one or both sides, is keyed an angle-lever 33. A connecting-rod 34 connects the end of said angle lever or levers with the end of the swinging arm 11 immediately above, so that as said swinging arm 11 is moved upward the plate 31 will be moved from the position shown in dotted lines in Fig. 2 to the position shown in full lines, Fig. 1, and will bear upon the upper end of the angle-piece 4, so as to be effectively supported thereby when the bale drops thereoff.

In horizontal two-roll machines an objection which has been noted in practice is that the bat after it has passed down on one roll, thence under the core, starts to follow the other roll away from the core, and it has been the practice with such machines to force the bat at the starting of the bale down upon the core by means of sticks. I illustrate in the drawings a device by which this may be done automatically, comprising a plate 35, which is pivoted to two of the swinging arms 11 and which when said swinging arms are at their lowermost position drops down upon one of the baling-rolls 10 immediately above the core. When, therefore, the bat after it has passed down and under the core sticks to said baling-rolls, so as to be carried away from the core, said plate 35 will peel it off of said roll and it will drop by its weight down on the core and be wound around the same. It is desirable that this plate 35 should be gotten out of the way of the bale as it enlarges, and in order that this may be done a connecting-rod 36 may connect said plate 35 with the other swinging arm or arms, so that said plate will be lifted out of the way. It is obvious that the plate may be moved out of the way of the bale in other ways, or the plate may, however, rest upon the bale. It is further obvious that instead of a plate a small rod may be employed in contact with one of the baling-rolls and by which the same result will be effected.

The operation of my improved baling-press is as follows: At the commencement of the baling operation the baling-rolls 10 are in their lowermost position, (shown in Figs. 2 and 4,) and a continuous sheet or bat from the condenser is fed upon the baling-roll at the right of these figures. Power being applied to the band-wheel 9, so as to drive the shaft 8 and pinions 14, said baling-rolls will be driven in the same direction through the gearing 13, as will be understood. This carries the sheet or bat of cotton down in contact with the core 12, and by interposing the bar 30 or other obstruction beneath said core said bat is caused to wind around the same. By employing the plate or equivalent element 35 the said bat is prevented from following the other baling-roll and being carried away from the core. As the bale commences to enlarge the baling-rolls 10 10 are slowly separated, and at the same time the core 12 is elevated by means of the links 21, so as to be always kept substantially in line with the horizontal axis of the baling-rolls. At the same time pressure is imposed upon the bale by the weight of said baling-rolls and by the supplemental compression mechanism, if used. By mounting the baling-rolls 10 on swinging arms, as I have explained, the pressure effected by said rolls upon the bale will be gradually increased as the bale enlarges, and when the baling-rolls are sufficiently heavy they may serve to effect the entire compression on the bale. As the bale enlarges the plate 31 is carried toward the position shown in full lines in Fig. 1, so that when the bale is entirely complete the plate 31 will rest upon the top of the heavy angle-iron 4. When the bale has been suitably covered or bound, as desired, it may be allowed to drop by its own weight from between the baling-rolls 10 10, or instead the clutch 15 may be operated so as to disengage one of the baling-rolls from the driving-shaft 8, and when power is then applied to said shaft the other baling-roll will drive the bale from between the same. The ejected bale falling from between the baling-rolls is received upon the plate 31 and rolls down the same on the plate 5 out of the machine.

The entire machine which I have invented is simple in construction and possesses the important advantage of having only a very slight pressure applied to a bale at the commencement of the baling operation, which pressure is gradually increased as the bale enlarges.

Having now described my invention, what I claim as new therein, and desire to secure by Letters Patent, is as follows:

1. In a cotton-press for making cylindrical bales, the combination of two baling-rolls, each carried solely in swinging arms pivoted at or near a common point, so that said arms may be swung apart as the bale enlarges and a support for the bale, substantially as set forth.

2. In a cotton-press for making cylindrical bales, the combination of two baling-rolls, each carried solely in swinging arms pivoted at or near a common point, so that said arms may be swung apart as the bale enlarges, a support for the bale and means for driving said baling-rolls, substantially as set forth.

3. In a cotton-press for making cylindrical bales, the combination of two baling-rolls, each carried solely in swinging arms pivoted at or near a common point, so that said arms may be swung apart as the bale enlarges a support for the bale, means for driving said baling-rolls, and means for keeping the faces of said baling-rolls parallel with each other, substantially as set forth.

4. In a cotton-press for making cylindrical bales, the combination of two baling-rolls, each carried solely in swinging arms pivoted at or near a common point, so that said arms may be swung apart as the bale enlarges a support for the bale, means for driving said baling-rolls, and means for effecting pressure on said baling-rolls, substantially as set forth.

5. In a cotton-press for making cylindrical bales, the combination of two baling-rolls, each carried solely in swinging arms pivoted at or near a common point, so that said arms may be swung apart as the bale enlarges, means for driving said baling-rolls, and a core mounted between said baling-rolls on which the bale is formed, substantially as set forth.

6. In a cotton-press for making cylindrical bales, the combination of a core on which the bale is formed, a baling-roll normally in substantially the same horizontal plane as the core, two swinging arms pivoted in a plane above the core and carrying said baling-roll at their lower ends, a second baling-roll pressing on the other side of the bale, and means for driving said baling-rolls, substantially as set forth.

7. In a cotton-press for making cylindrical bales, the combination of two baling-rolls arranged in the same horizontal plane, and each carried in swinging arms, a horizontal shaft from which said swinging arms are hung, whereby said swinging arms may be swung apart as the bale enlarges and a support for the bale, substantially as set forth.

8. In a cotton-press for making cylindrical bales, the combination of two baling-rolls arranged in the same horizontal plane, and each carried in swinging arms, a horizontal shaft from which said swinging arms are hung, whereby said swinging arms may be swung apart as the bale enlarges, a support for the bale and means for driving said baling-rolls, substantially as set forth.

9. In a cotton-press for making cylindrical bales, the combination of two baling-rolls arranged in the same horizontal plane, and each carried in swinging arms, a horizontal shaft from which said swinging arms are hung, whereby said swinging arms may be swung apart as the bale enlarges a support for the bale, means for driving said baling-rolls, and means for effecting pressure on said baling-rolls, substantially as set forth.

10. In a cotton-press for making cylindrical bales, the combination of two baling-rolls arranged in the same horizontal plane, and each carried in swinging arms, a horizontal shaft from which said swinging arms are hung, whereby said swinging arms may be swung apart as the bale enlarges, means for driving said baling-rolls, and a core mounted between said baling-rolls and on which the bale is formed, substantially as set forth.

11. In a cotton-press for making cylindrical bales, the combination of two baling-rolls arranged in the same horizontal plane, and each carried in swinging arms, a horizontal shaft from which said swinging arms are hung, whereby said swinging arms may be swung apart as the bale enlarges, means for driving said baling-rolls, a core mounted between said baling-rolls on which the bale is formed, and means for elevating the core as said baling-rolls are moved upward, whereby said core will be always maintained substantially in line with the horizontal axis of the baling-rolls, substantially as set forth.

12. In a horizontal two-roll baling-press, the combination of the two baling-rolls, a core mounted between said baling-rolls and on which the bale is formed, a bar beneath and parallel with said core when the baling-rolls are at their innermost positions, and means for withdrawing said bar as the baling-rolls separate, substantially as set forth.

13. In a horizontal two-roll baling-press, the combination of the roll on which the bat is received, the core, the other roll, a scraper carried upon or adjacent to the latter roll for the purpose mentioned, and means for elevating the scraper as the bale enlarges, substantially as set forth.

14. In a horizontal two-roll baling-press, the combination of the side frames 1, 1, a horizontal bearing 7 at the upper part of each side frame, swinging arms 11 supported by said bearing, baling-rolls carried at the lower ends of said swinging arms a bale-support, a shaft 8 mounted in said bearings, and connections between said shaft and said baling-rolls for driving the latter, substantially as set forth.

15. In a horizontal two-roll baling-press, the combination of the side frames 1, 1, a horizontal bearing 7 at the upper part of each side frame, swinging arms 11 supported by said bearing, baling-rolls carried at the lower ends of said swinging arms a bale-support, a shaft 8 mounted in said bearing, a pinion keyed to said shaft, another pinion loose on said shaft, a clutch 15 for connecting said loose pinion with said shaft, and connections between said pinions and said baling-rolls for driving the latter, substantially as set forth.

16. In a horizontal two-roll baling-press, the combination of the side frames 1, 1, a horizontal bearing 7 at the upper part of each side frame, swinging arms 11 supported by said bearings, baling-rolls carried at the lower ends of said swinging arms, means for driving said baling-rolls a bale-support, arms 23 connecting with the lower ends of said swinging arms, said arms 23 converging together at their lower end, a rack 25 connected with the lower end of each pair of converging arms 23, a pinion 27 engaging with each of said racks, and a shaft 28 extending across the machine and to which said pinions are keyed, substantially as set forth.

17. In a horizontal two-roll baling-press, the combination of the side frames 1, 1, a horizontal bearing 7 at the upper part of each side frame, swinging arms 11 supported by said bearings, baling-rolls carried at the lower ends of said swinging arms, means for driving said baling-rolls, a bearing-box 18 sliding vertically in each side frame, links 21 connecting said bearing-boxes with the swinging arms 11, and a core-supporting device in each bearing-box, substantially as set forth.

18. In a horizontal two-roll baling-press, the combination of the two baling-rolls, a core mounted between said baling-rolls on which the bale is formed, a plate 31 mounted in the side frames, a bar 30 at the upper end of said plate arranged beneath the core at the starting of the bale, and means for moving said plate 31 so that when the bale is formed, said plate will constitute a guide or chute for receiving the bale, substantially as set forth.

19. In a cotton-press for making cylindrical bales, the combination of a main driving-shaft to which power is applied, a pair of baling-rolls movable toward and away from said shaft for effecting compression of the bale, connections between said driving-shaft and rolls for driving the latter, flanges for the ends of the bales, and connections between the flanges and rolls, whereby the flanges will be movable with the rolls toward and away from said driving-shaft, substantially as set forth.

This specification signed and witnessed this 19th day of February, A. D. 1896.

FRANK L. DYER.

Witnesses:
R. J. BEALL, Jr.,
ARCHIE G. REESE.